United States Patent [19]

Brown

[11] Patent Number: 4,861,363
[45] Date of Patent: Aug. 29, 1989

[54] LUBRICANT SPRAY DEVICE FOR GLASS MOULDS

[75] Inventor: Roy Brown, Sheffield, England

[73] Assignee: Graphoidal Developments Limited, Sheffield, England

[21] Appl. No.: 126,492

[22] Filed: Nov. 30, 1987

Related U.S. Application Data

[63] Continuation of Ser. No. 33,654, Apr. 3, 1987, abandoned, which is a continuation of Ser. No. 871,130, Jun. 2, 1986, abandoned, which is a continuation of Ser. No. 614,838, May 29, 1984, abandoned.

[30] Foreign Application Priority Data

Jun. 2, 1983 [GB] United Kingdom ............... 8315153

[51] Int. Cl.⁴ .................................................. C03B 40/02
[52] U.S. Cl. ............................................. 65/24; 65/26; 65/170; 65/262; 118/300; 118/317
[58] Field of Search ............... 65/24, 25.1, 26, 170, 65/262; 118/300, 317; 239/424, 426, 434; 284/626, 58

[56] References Cited

U.S. PATENT DOCUMENTS

| | | | |
|---|---|---|---|
| 3,141,752 | 7/1964 | Keller | 65/25.1 |
| 3,480,422 | 11/1969 | Lichok et al. | 65/24 |
| 3,536,468 | 10/1970 | Collhagoff | 65/262 |
| 3,623,856 | 11/1971 | Keller | 65/24 |
| 3,672,860 | 6/1972 | Keller | 65/24 |
| 3,814,594 | 6/1974 | Mumford | 65/24 |
| 3,857,691 | 12/1974 | Jones et al. | 65/25.1 |
| 4,206,160 | 6/1980 | Suddendorf et al. | 239/434 |
| 4,284,590 | 8/1981 | DeBoer, Jr. et al. | 239/434 |
| 4,396,529 | 8/1983 | Price et al. | 118/300 |
| 4,409,010 | 10/1983 | Brown | 65/26 |
| 4,422,574 | 12/1983 | Mancuso, Jr. | 239/424 |
| 4,452,578 | 6/1984 | Levine et al. | 65/24 |

FOREIGN PATENT DOCUMENTS 43261 1/1982 European Pat. Off.
1371728 10/1974 United Kingdom.

OTHER PUBLICATIONS

"Air-Movers" Brochure, 6 pages, Economatics Ltd, Sheffield, Gt. Britain.
"The Beck Ring Jet Air Mover" brochure, O. N. Beck & Co. Ltd, 104 Fox Lane, London, 8 pages.
"Autoswabbing Success at Saint Gobain" Jean Morin, Glass-Sep. 1988, pp. 349, 350.

Primary Examiner—Arthur Kellogg
Attorney, Agent, or Firm—William R. Hinds

[57] ABSTRACT

Lubrication of the parison moulds of a hollow glassware moulding machine is carried out utilizing a spray device in which the discharge of pressurized air from a narrow opening is arranged to entrain surrounding atmospheric air. Liquid lubricant is discharged through a respective opening into this entrained air. Such spray devices have been found to be effective in spraying lubricant down into relatively deep moulds.

17 Claims, 5 Drawing Sheets

LUBRICANT SPRAY DEVICE FOR GLASS MOULDS

This is a continuation of application Ser. No. 033,654 abandoned filed Apr. 3, 1987, which is a continuation of Ser. No. 871,130 abandoned filed June 2, 1986, which is a continuation of Ser. No. 614,838 filed 5/29/84, abandoned.

FIELD AND BACKGROUND OF THE INVENTION

This invention relates to the manufacture of glass bottles or other hollow glassware. The invention is concerned with the application of lubricant to the moulds in which parisons are made.

The manufacture of hollow glassware is a two stage process. First a "gob" of molten glass is dropped into a so-called "blank mould" where it is formed into a hollow parison. This is carried over into a "blow mould" where it is blown out into the bottle or other glass product. The blank moulds require periodic lubrication (so-called "swabbing"). It is notorious that it would be desirable to effect this lubrication automatically. There have been numerous proposals for this, for instance in U.S. Pat. Nos. 3,141,752, 3,480,422, 3,580,711, 3,623,856, 3,721,542, 3,814,594 and 4,391,620.

Nevertheless manual swabbing with a small mop remains widespread.

My U.S. Pat. 4,409,010, assigned to the assignees of this application, describes equipment for automatic spraying of blank moulds from fixed spray heads which spray while the moulds are open. This equipment has operated successfully in some plants.

We have, however, identified one difficulty with this equipment. This is difficulty in spraying the lower parts of a relatively deep mould, e.g. a blank mould used when the end product is a tall bottle.

This equipment, as shown in our EP-A-43261 sprays liquid lubricant mixed with air which is being supplied through closed ducts from a pressurised supply. Most of the earlier proposals also discharged liquid lubricant in air from a pressurised air supply. The only alternative appears to have been use of an airless lubricant spray, e.g. in U.S. Pat. Nos. 3,523,016 and 4,391,620.

SUMMARY OF THE INVENTION

The object of the present invention is to provide a spray device able to spray down relatively deep blank moulds.

According to the present invention there is provided a lubricant spray device, for spraying lubricant onto a blank mould of a hollow glassware moulding machine containing a passage for pressurised air leading to pressurised air discharge, opening, and having a lubricant passage leading to a lubricant discharge opening, characterised in that the pressurised air discharge opening is arranged such that the discharging pressurised air entrains additional air from the surrounding atmosphere, and the lubricant discharge opening is positioned to discharge the lubricant into the flow of entrained air.

I have found that such a delivery device is far better at spraying fully down deep blank moulds, so that the lower part of the mould cavity is lubricated effectively as well as the upper par. It can spray effectively into closed moulds, and then serves to lubricate the neck ring at the base of the moulds, as well as lubricating the mould cavities themselves.

A suitable arrangement for entraining the surrounding atmospheric air is to discharge the pressurised air through a narrow orifice shape and arranged so that the discharging air follows an extension of the wall at one side of the orifice. As it does so, it entrains surrounding air in accordance with the Coanda principle.

In a preferred arrangement the spray delivery device defines a through passage for the entrained air, and the lubricant discharge opening is positioned to discharge into this passage. Preferably it is a continuous slot encircling this passage.

The volume of entrained air may typically be in excess of ten, and indeed twenty times the volume of pressurised air. The present invention provides, in combination, a hollow glassware moulding machine comprising blank moulds for forming glass parisons, and one or more spray devices fitted to the machine, each spray device comprising an air inlet for pressurised air, means defining a discharge opening for the air, air passage means communicating the air inlet with the discharge opening, the air discharge opening being shaped and arranged such that discharging pressurised air creates a region of reduced pressure drawing in a greater volume of additional air from surrounding atmosphere and forms an air stream therefrom, a lubricant inlet for liquid lubricant, a discharge opening for the lubricant, lubricant passage means communicating the lubricant inlet with the lubricant discharge opening, the lubricant discharge opening being positioned to discharge the lubricant into the indrawn air, and means for periodically discharging lubricant simultaneously with air through the one or more devices onto the blank moulds of the machine. The machine may be provided with, e.g. connected to, means for periodically discharging lubricant and pressurised air through the device(s) onto the blank moulds of the machine. In particular the machine may be a so-called IS (Independent Section) machine having the devices fitted in or incorporated into movable carrier(s) arranged to position the device(s) over the closed positions of respective mould cavities. These carriers may be the funnel arms of the machine.

In a further aspect this invention provides, in a method of moulding parisons for hollow glassware by forming molten glass into parisons in blank moulds of an automatic moulding machine, and periodically lubricating said blank moulds, the improvement comprising effecting said lubricating by means of a spray of lubricant in air through one or more spray devices, each such spray device comprising an air inlet for pressurised air, means defining a discharge opening for said air, air passage means communicating said air inlet with said discharge opening, said air discharge opening being shaped and arranged such that discharging pressurised air creates a region of reduced pressure drawing in a greater volume of additional air from surrounding atmosphere and forms an air stream therefrom; a lubricant inlet for liquid lubricant, a discharge opening for said lubricant, lubricant passage means communicating said lubricant inlet with said lubricant discharge opening, said lubricant discharge opening being positioned to discharge said lubricant into said indrawn air, the lubricating being effected by periodically discharging pressurised air from said air discharge opening and simultaneously discharging lubricant from said lubricant discharge opening into said indrawn air.

The spray devices of this invention could be used in various ways. One possibility is for them to be incorporated in fixed mountings to spray the moulds while open, in accordance with my U.S. Pat. No. 4,409.010. However, the spray is preferably applied to the closed moulds, (or possibly to nearly closed, closing moulds) and it will then generally lubricate the neck rings below the moulds, as well as the mould cavities themselves.

For spraying into closed moulds, as is preferred, one possibility is for the spray devices to be carried in the funnel arms of an IS machine. The gobs of molten glass will then almost certainly need to be loaded directly into the mould cavities, so-called "direct loading", rather than loaded through the funnel.

A "press and blow" process could be employed. When this is combined with direct loading the funnel arm is not needed, and hence is available for carrying the spray devices of this invention.

A modified "blow and blow" process could be employed, and this is a further inventive feature. In this modified blow and blow process the "settle air" which presses the gob down in the mould cavity is delivered through a spray delivery device of this invention. The moulding cycle then comprises the steps of:

placing blank moulds over a neck ring,
dropping a gob of molten glass into the mould cavity,
positioning over the cavity a spray device as set forth above and which has a passage for entrained air, and blowing in settle air through the said passage for entrained air,
removing the spray device, placing a baffle sealingly over the top of the cavity,
blowing air in from below to form the parison
removing the blank moulds,
carrying away the parison by means of the neck ring, and then returning the neck ring.

The spray device can be carried in a funnel arm, and the settle air can be delivered through a normal baffle.

Periodically, the spray device is positioned over the closed moulds while the mould cavity is empty, and lubricant is discharged into the cavity between the closed or closing moulds.

Most preferred is for the spray devices to be carried by movable carrier structures each of which is an addition fitted to a respective section of an IS glass moulding machine. This carrier structure is fitted on the funnel arm shaft, and remains in an inoperative position except when required to effect lubrication. It then moves to an operative position to spray into the closed moulds.

Lubrication will generally take place at regular intervals, after a predetermined number of moulding cycles have occurred. With all the above possibilities for spraying into closed (or closing) moulds, the lubrication preferably takes place during a cycle in which no gob is loaded. Alternatively, however, the timing of all the moulding cycles may be adjusted to create an interval before the gob enters the closed moulds. Lubrication might then be carried out during this interval in required cycles only, immediately before entry of a gob..

BRIEF DESCRIPTION OF THE DRAWINGS

FIG.. 9 is an elevational view of the apparatus, partly cut away.

DESCRIPTION OF PREFERRED EMBODIMENTS

Figure 1:
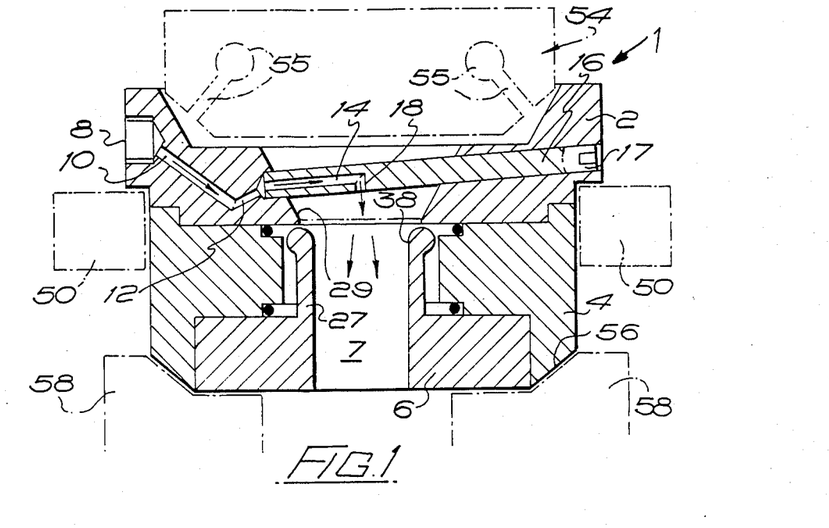
FIG. 1 shows a vertical cross section through a spray head.
Figure 2:
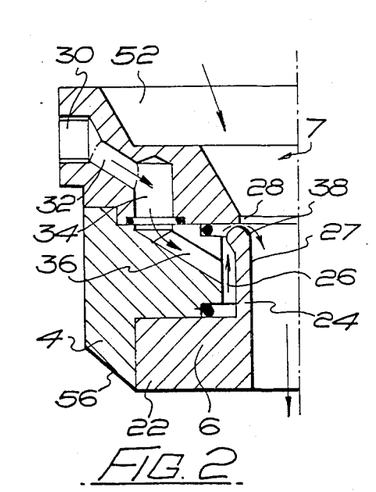
FIG. 2 shows a second vertical cross section of half of the head, the plane of this section being at 60° to the plane of FIG. 1.

Referring to FIGS. 1 and 2 of the drawings, the spray head 1 shown consists of three parts; an upper ring 2, a lower ring 4 and an insert 6 within the lower ring. The three parts are fastened together by bolts, not shown, passing through the upper ring 2 downwardly into tapped holes in the lower ring 4 and further bolts, also not shown, passing downwardly through the lower ring 4 into further tapped holes in the insert 6. The spray head defines a central passage 7 for entrained air.

The upper ring 2 is provided with a port 8 for the admission of lubricant, which may be a graphite-in-oil suspension. This port communicates by bores 10, 12 with a passage 14 in a plug 16 inserted into the ring 2 and retained by a small screw 17. The passage 14 leads to a discharge aperture 18 approximately at the centre of the passageway 7.

The insert 6 has a base portion 22 with an upstanding cylindrical portion 24 which is dimensioned to be spaced from the ring 4 and hence defines a cylindrical chamber 26 between the portion 24 and the ring 4. The upper end of the portion 24 has a bulbous curved shape and is dimensioned so that a narrow aperture 28 is defined between it and the upper ring 2. As seen from FIG. 2, the upper ring 2 is provided with a port 30 for the admission of compressed air. This communicates (through drilled holes 32, 34, 36) with the cylindrical chamber 26. The insert's inner wall 27 is of lesser diameter than the adjacent wall 29 of the central hole through the upper ring 2, and the insert provides a curved wall portion 38 leading from the aperture 28 to the wall 27.

When compressed air is delivered into the port 30 it flows down into the annular chamber 26 and escapes through the narrow aperture 28. It then follows the smoothly curved surface of the insert's wall portion 38. It entrains additional air, and the result is that atmospheric air from generally above the spray head is sucked down through the central passage 7 and blown out at the bottom. The air stream blown out in this way is of considerably greater volume than the quantity of compressed air introduced via the port 30.

For use, the spray head is connected to equipment as described in my U.S. Pat. No. 4,409,010 (the disclosure of which is incorporated herein by reference). This equipment will, when required, supply pressurised air through a flexible hose to the port 30 while also supplying the liquid lubricant through another hose to the port 8. The compressed air causes the flow of entrained air down through the passageway 7 in the manner just described and while this is taking place lubricant is discharged through the hole 18 into the flow of entrained air which atomises the lubricant so that it is carried downwardly as a spray of lubricant in the air stream.

The equipment shown in U.S. Pat. No. 4,409,010 counts IS machine cycles, and effects lubrication each time a preset count is reached. It usually lubricates every section of an IS machine in succession. It also permits additional applications of lubricant under manual command to any one section.

As can be seen from FIG. 1, the spray head 1 is dimensioned to fit into one of the apertures provided in the funnel arm 50 of an IS machine. This arm 50 is used to carry the spray head into place above a pair of closed-together blank moulds, either to spray lubricant or for settle air to be blown through the spray head from a baffle of the IS machine. The funnel arm and baffle arm move between their usual positions.

The spray head 1 is provided with an upper central space 52 in which the baffle 54 can be received as shown. The baffle 54 incorporates passageways 55 for settle air, as is conventional. At its lower edge the spray head is provided with a chamfer 56 enabling it to rest sealingly in the top of a pair of closed together blank moulds 58 (but if these had a different shape, the lower edge of the spray head would be shaped to fit).

Figure 3:
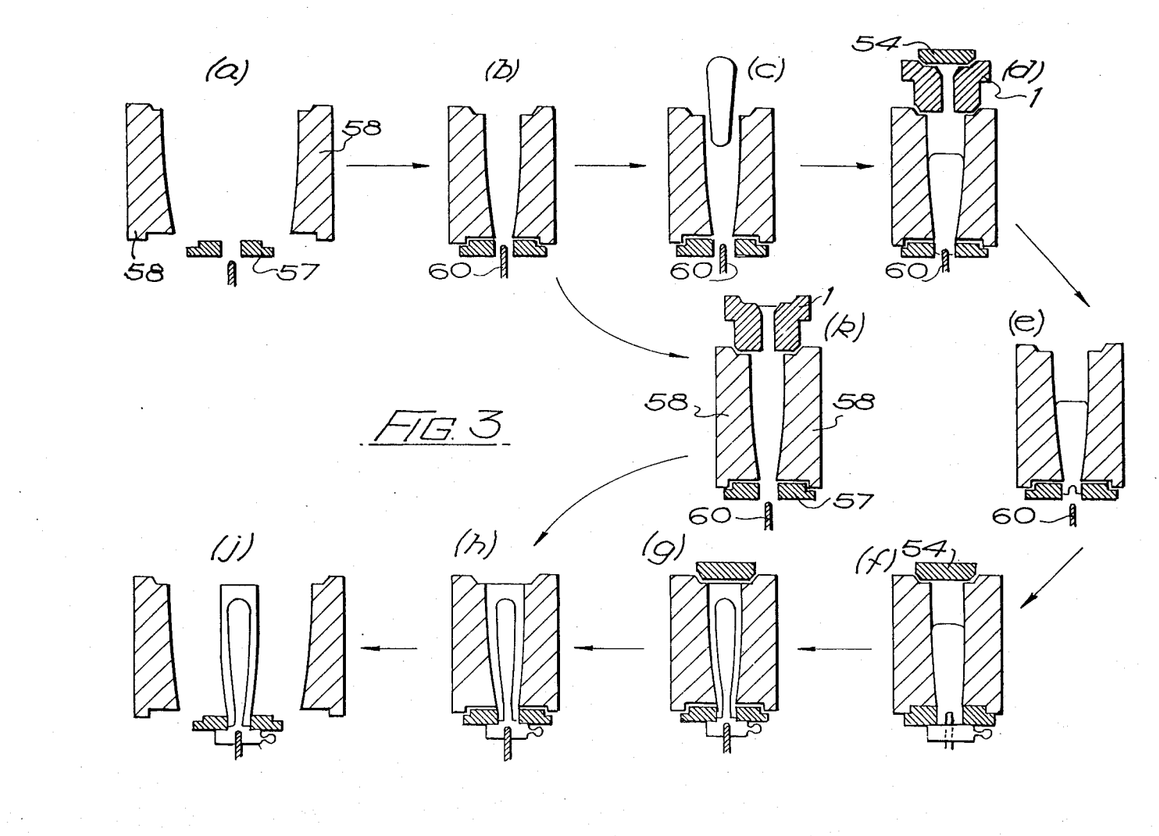
FIG. 3 diagrammatically illustrates a blow and blow process.

By way of illustration, FIG. 3 shows the spray head 1 employed is a blow-and blow process for which lubrication is carried out after a predetermined number of moulding cycles. No gob is loaded during a lubrication cycle. The sequence of operations shown in FIG. 3 is as follows:

(a) An empty neck ring 57 returns from the final stage of the previous cycle.
(b) The blank moulds 58 close over it, and the plunger 60 is raised into the neck ring.
(c) A gob of glass is dropped into the blank moulds.
(d) The spray head 1 is seated on top of the blank moulds, the baffle 54 is seated on top of the head 1, and settle air is injected into the mould cavity from the baffle 54 via the passageway 7 through the head 1.
(e) The baffle 54 and the head 1 are then removed, and the plunger 60 is removed from the neck ring 57.
(f) The baffle 54 is then placed directly on top of the blank mounds 58.
(g) The parison is blown.
(h) The baffle 54 is then removed.
(j) The blank moulds 58 are opened, following which the parison is inverted into the final blow mould using the neck ring. After this the neck ring returns empty and the cycle is repeated.

After a predetermined number of such machine cycles, lubrication is effected automatically in the next cycle which is modified. After the moulds close at stage (b) no gob is loaded. The funnel arm then carries the head 1 onto the top of the moulds 58 and lubricant is sprayed (stage k). The baffle 54 does not go onto the moulds at all, and after the lubricant has been sprayed the moulds remain empty until the next cycle. The plunger is preferably kept down while lubricant is sprayed, to ensure an air outlet opening at the bottom of the mould cavity. Thus during a lubrication cycle the spray head 1 can be put on and taken off at the same points in the cycle as for the blowing in of settle air, but the baffle and plunger need not move at all during the cycle. In order to keep the mould temperature fairly steady, it may be desirable to cut off the cooling air during a lubrication cycle, and/or during the preceding cycle.

The counting of moulding cycles and the discharge of pressurised air and lubricant are effected with equipment according to U.S. Pat. No. 4,409,00 mentioned above. Signals from this equipment can be employed to disable appropriate valves of the IS machine during a lubrication cycle, so as to prevent entry of a gob, and prevent unwanted movements of plunger 60 and baffle 54.

In general, movements which are not required during a lubrication cycle are prevented by disabling IS machine valves during the appropriate part of a lubrication cycle. Movements which are only required during a lubrication cycle can be achieved by disabling the appropriate valves in normal moulding cycles. For example the valve supplying pressure to the funnel arm would be disabled during normal moulding cycles of a direct loading press-and-blow process, but the funnel arm would be used to put the spray head on the moulds during a lubrication cycle. FIGS. 4 to 9 show a further preferred, spray device. It is shown in a form for spraying the moulds of a double gob machine (i.e. a machine having two mould cavities in each pair of blank moulds). The device has a block 70 which is cast as part of a carrier structure described below and fitted as an addition to an IS machine. This block has a pair of inserts 72 which are a push fit into bores in the block 70. O-rings 74 seal between the inserts 72 and the block 70. The inserts 72 provide the discharge openings for pressurised air. The lubricant discharge openings are formed in a plate 76 which is mounted on the block 70 so as to projet above the inserts 72.

Figure 5:
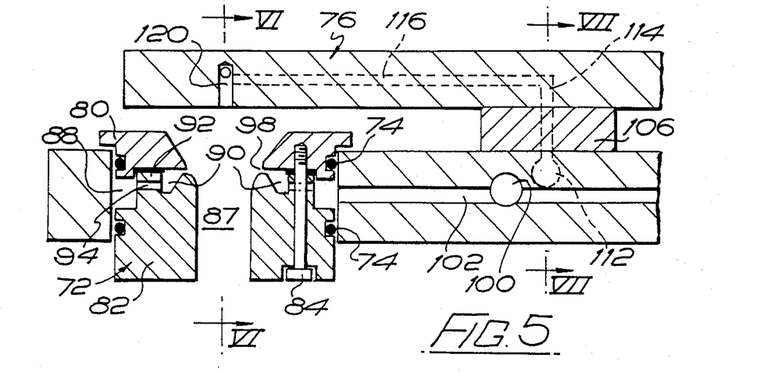
FIGS. 5, 6 and 7 are vertical cross sections of this device on lines V—V, IV—IV and VII—VII.
Figure 6:
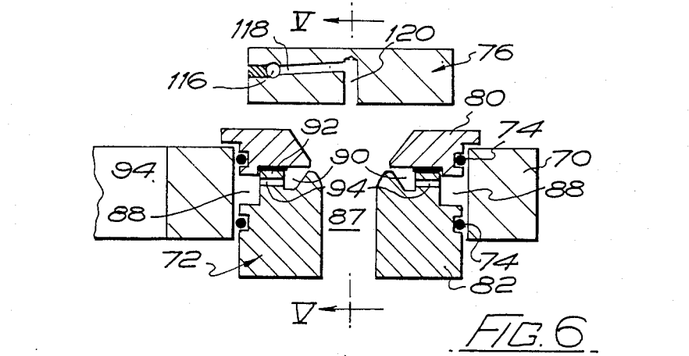
Figure 7:
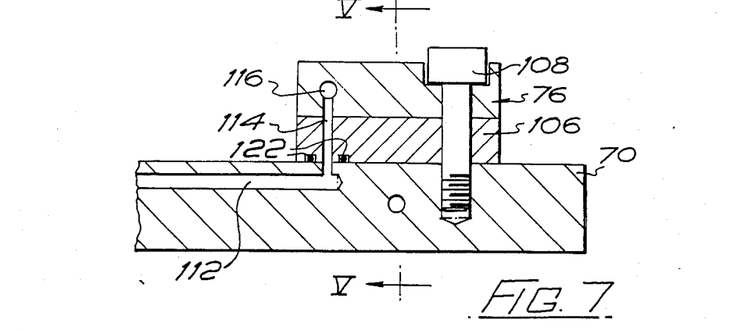
Figure 8:
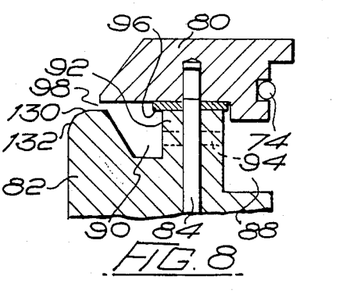
FIG. 8 is an enlarged detail view showing the pressurised air discharge opening.

Each insert 72 consists of an upper part 80 and a lower part 82 secured to the upper part by three screws 84. These coaxial annular parts define a through central passage 87. They are formed by turning on a lathe. The upper surface of the lower part 82 is cut away to form two annular chambers 88,90 for pressurised air, separated by an annular collar 92 with a flat top surface. The screws 84 pass vertically through this collar 92 while a number of horizontal bores 94 distributed around the collar 92 provide communication between the annular chambers 88 and 90. As shown the screws 84 are inserted from below. However, they could be inserted downwardly, through the upper part 80 into tapped through holes in the lower part 82.

An annular shim 96 is provided between the collar 92 and the flat under surface of the upper part 80. Because of this shim, a narrow opening having a vertical width equal to the thickness of the shim, is provided at 98 encircling the through passage 87. This is the discharge opening for pressurised air. (The thickness of the shim is shown somewhat exaggerated in the drawings).

The block 70 is cast integral with a horizontal bar 124. Pressurised air is introduced into this bar along a hose 126 connected to an inlet port (not shown) on the bar 124. From here an air passage 100 drilled in the bar 124 leads to an air passage 102 in the block 70, and this passage 102 leads to the annular chamber 88 of each insert. From there the air travels via the horizontal bores 94 to the chamber 90 from which the pressurised air discharges through the narrow opening 98. The upper surface of the lower part 82 extends beyond the opening 98 and merges smoothly into the through bore 87. The discharging pressurised air follows around this smooth surface into the through bore 87 and as it does so it entrains air from the surrounding atmosphere to be ejected downwardly through the bore 87.

The plate 76 is fast with a small central block 106 which rests on the block 70 and hence spaces the plate 76 above the block 70. The plate 76 and block 106 are releasably secured on to the block 70 by means of a screw 108. This allows the plate 76 to be taken off either for cleaning or to allow the inserts 72 to be removed.

Lubricant is supplied along hose 128, and enters the bar 122 through an inlet part (not shown). From here it travels along a bore 112 leading into the block 70, and then travels via bores 114, 116 and 118 to lubricant discharge openings 120 in the undersurface of the plate 76 directly above the through passages 87. A sealing ring is provided at 122 and the block 106 may be provided with dowels to engage into the cast block 70 to ensure proper alignment.

We have found that the surface of the lower part 82 extending round from the air discharge opening 98 to merge with the through bore 87 does not have to be a smooth curve. Satisfactory results can be obtained if this surface is approximated by bevelled faces. This is shown by the enlarged detail FIG. 8 in which the bevelled faces are indicated by the reference numerals 130, 132.

Figure 4:
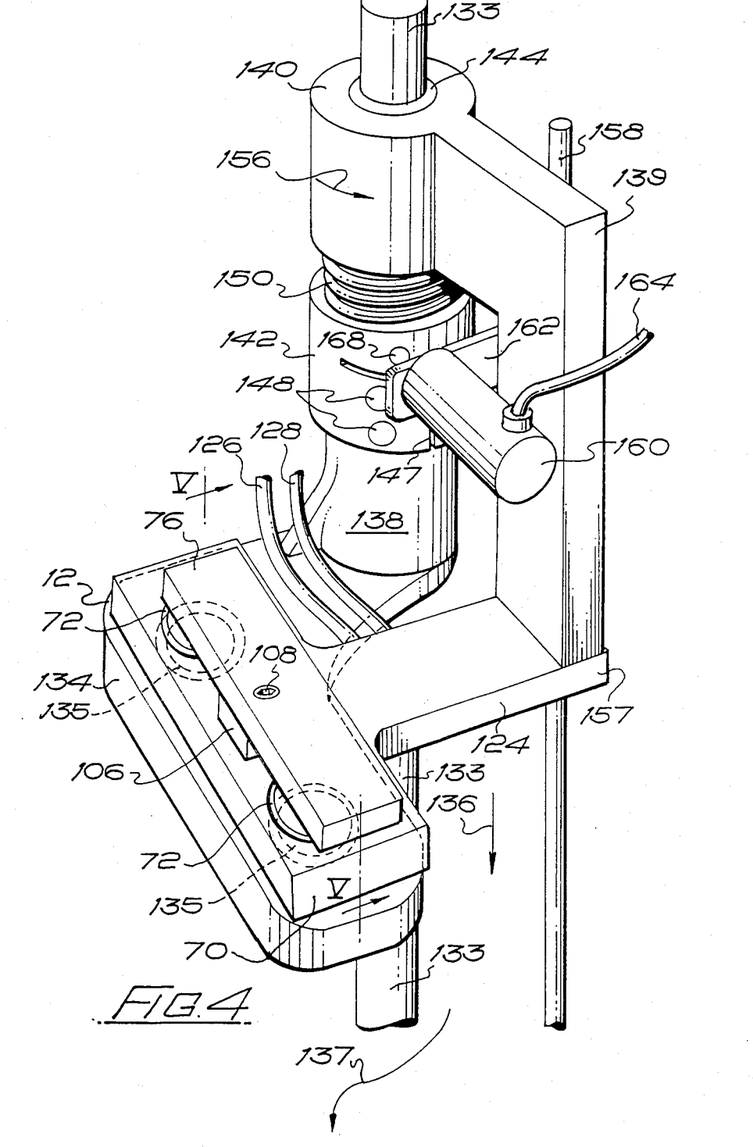
FIG. 4 is a perspective view illustrating a further form of spray device and parts of an IS machine.
Figure 9:
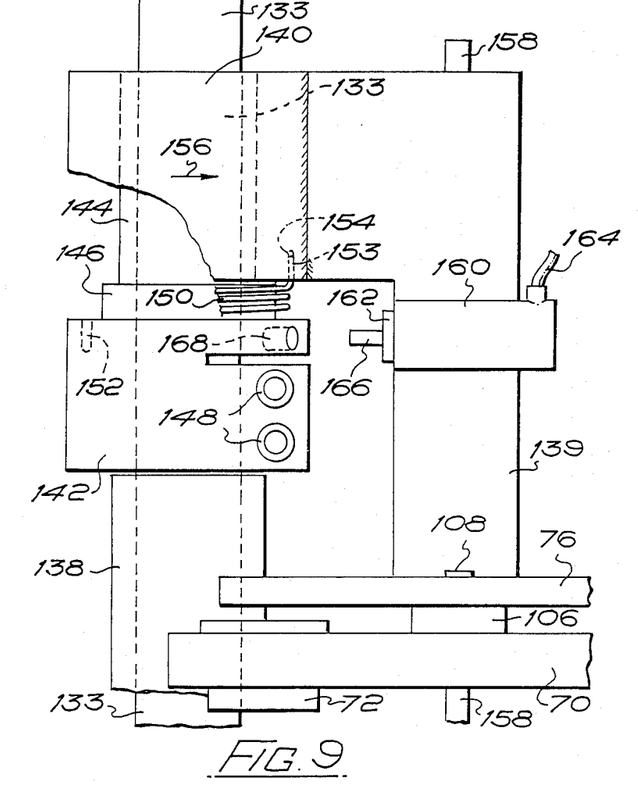
Figure 10:
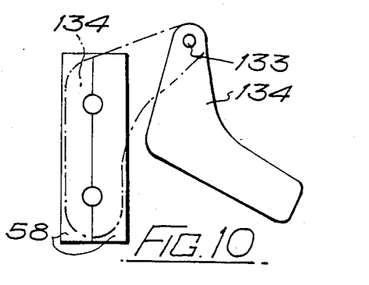
FIG. 10 is a diagrammatic plan view showing the positions of a funnel arm relative to the closed moulds.

FIGS. 4 and 9 show how this spray device is carried into position for spraying. FIG. 4 shows in perspective the top part of the funnel arm shaft 133 of one section of a double gob IS machine, with the funnel arm 134, and funnels 135 of this section of the IS machine, all in their rest position. When the funnels 135 are required to be swung into their operative position over the top of the blank moulds, a pneumatic cylinder which is part of the IS machine and located somewhat below the parts in FIG. 4 urges the shaft 133 straight down in the direction of arrow 136. However, a cam (not shown) on the lower part of the shaft 133, engaging a fixed cam track (not shown) converts the downward force into a descending swing through 55° or so, followed by a straight drop onto the top of the blank moulds. This movement is represented by arrow 137. This is standard practice on an IS machine and is illustrated by FIG. 10 which shows from above the position of the closed moulds 58 and the outline of the funnel arm 134 in its operative position (chain lines) and its rest position (full lines).

The funnel arm 134 is cast integral with a collar 138 which is split, and is tightened onto the shaft 133 by clamping bolts (not shown). Fitted onto the shaft 133 above the collar 138 are additional parts which provide a novel carrier structure for the spray devices.

The block 70 is, as mentioned, cast integral with a horizontal bar 124. An L-shaped upright 139 is integral with or welded to the bar 124. The upright 139 is integral with or welded to a collar 140.

The carrier structure is pivotally mounted on the shaft 133 through a fixed boss which fits onto the top part of the shaft 10 and consists of a collar 142 integral with a sleeve 144 of lesser diameter to which it is joined through a ring 146 of intermediate diameter. The lower part of the collar 142 is split at 147 and is tightened onto the shaft 133 immediately above the collar 138 of the funnel arm, by means of clamping bolts 148. If necessary the sleeve 144 can project up beyond the top of the shaft 133.

The collar 140 is free to pivot on the sleeve 144, resting on the ring 146. A coil spring 150 encircles the ring 146; one end of it fits into a hole 152 in the collar 142, its other end 153 fits into a hole 154 in the collar 140. The spring biases the collar 140 in the direction shown by arrows 156 until the end 157 of bar 124 bears against a fixed stop in the form of a bar 158 projecting upwardly from fixed structure below (not shown).

A small pneumatic cylinder 160 is mounted on a bracket 162 fast with the upright 139. When this cylinder is pressurised with air entering along hose 164 it drives a plunger 166 out, against a return spring, into a bore 168 in the upper part of the collar 142. The effect of this, of course, is to couple the collar 140 rotationally to the collar 142 and indeed to the shaft 133 so that all of them move as one piece as long as the cylinder 60 remains pressurised.

For use this spray device, and the cylinder 160, are connected to a control and supply equipment generally similar to that shown in my U.S. Pat. No. 4,409,00. This equipment will count normal moulding cycles; then at a predetermined count it will bring about a lubrication cycle in substitution for a normal moulding cycle.

During a moulding cycle the cylinder 160 is never pressurised. The funnel arm 134 is carried into position over the blank moulds at the appropriate place(s) in the moulding cycle, but the spring 150 holds the carrier structure back against the stop bar 158. The carrier structure moves up and down with the funnel arm 134 but does not rotate with it, and hence remains in an inoperative position.

In a lubrication cycle, the cylinder 160 is pressurised before the funnel arm 134 moves from its rest position, and it remains pressurised until it returns to the rest position. Consequently when the funnel arm 134 is swung over the top of the moulds and down into them, the block 70 is carried with it, and while thus in position pressurised air and lubricant are delivered along the hoses 126, 128 causing a spray of lubricant in air to discharge from both through passages 87 simultaneously, This spray passes through the funnels 135 into the blank mould cavities beneath lubricating these and the neck rings which are below.

The cylinder 160 remains pressurised until the funnel arm 134 and the spray outlets have returned to their rest position. It is then vented. The plunger 166 withdraws, and the funnel arm 134 is then free to move independently in the next cycle, which will be a moulding cycle.

As described in my U.S. Pat. No. 4,409,010 the control and supply unit has solenoid valves for each section of the IS machine. They are governed by controlling circuitry and through them pressurised air and lubricant are delievered to the hoses 124,126. For the equipment of FIGS. 4 to 9.

This control and supply unit is provided with an additional solenoid operated valve and controlling circuitry, for each IS machine section, all exactly analogous to that which governs pressurisation of air hose 126. This constitutes an additional "channel" which is used to pressurise the line 164 leading to the cylinder 160. However, this "channel" is adjusted differently, so as to hold the line 164 in a pressurised state for the longer period required.

During the lubrication cycle the delivery of gobs to the mould cavities is prevented and the operation of the baffle arm is prevented also. This is done by means of a signal from the control and supply unit during the lubrication cycle. This signal is connected so as to inhibit operation of the relevant pneumatic valves within the IS machine. If necessary the supply of cooling air over the blank moulds may also be stopped during a lubrication cycle, to reduce disturbance of the temperature of the blank moulds. If there are separate supplies of air to cool the blank moulds, neck rings and plunger, any or all of these could be stopped (or modified) during the lubrication cycle as required.

With the spray head of FIGS. 1 and 2 and likewise with the spray device of FIGS. 4 to 9 it is preferable to arrange that the discharge of compressed air continues after the discharge of lubricant. This serves to blow any remaining lubricant out of the through passages 7, 87. The lubricant passages 12, 14, 118 are all made to rise in the flow direction so as to inhibit leakage of lubricant. These two features (namely continued discharge of air after the discharge of lubricant and the use of upwardly rising lubricant passages proximate the lubricant discharge opening) serve to prevent unwanted drips of lubricant, in the same way as with the spray heads described in my above-mentioned U.S. patent.

Figure 11:
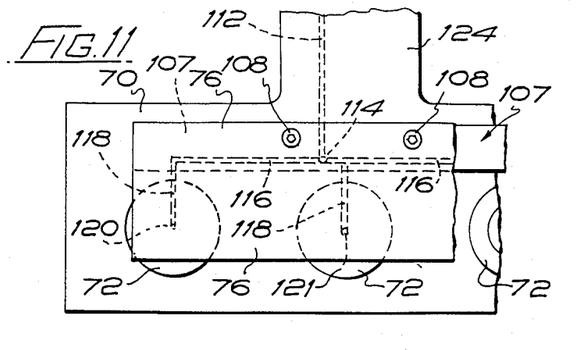
FIG. 11 is a diagrammatic plan view showing a modification.

FIG. 11 is a diagrammatic plan showing a modified support for the plate 76 which incorporates the lubricant discharge openings. Instead of the block 106 running transversely to the width of the plate 76, this plate is supported on a strip 107 running down one side. This strip 107 is held to the plate 76 by screws (not shown) extending upwardly into the plate 76. The plate 76 and strip 107 are then held down onto the block 70 by two screws 108.

This arrangement can be used with single and triple gob machines as well as double or quadruple gob machines, because it allows a lubricant discharge aperture to be at the central positions indicated as 121. The arrangement illustrated is for a triple gob machine.

Other modifications and variations are possible.

The above described spraying of lubricant, both in the case of FIGS. 1 and 2, and also in the cases of FIGS. 4 to 11, applies lubricant to the moulds and also the neck rings. It would be possible to start the lubricant supply before the supply of pressurised air, so that some lubricant droplets fall through the mould cavity onto the neck rings or plunger, after which the spray would continue as a lubricant in air spray.

There may be a lubrication cycle in which no air is delivered, at least until lubricant supply has ceased, so as to put drips of lubricant onto the neck rings and/or plunger. Contact of these drips with the hot neck rings or plunger causes vaporisation, blowing droplets of lubricant out radially.

There may be more than one type of lubrication cycle interspersed with moulding cycles. In particular a second counter could be provided in the control and supply unit, and used to provide a second type of lubricant discharge. For example there could be a sequence where a predetermined number of moulding cycles was followed by a lubrication cycle without air (dripping onto the neck rings and plunger as mentioned above) followed by a second and possibly different predetermined number of moulding cycles, followed by a second type of lubrication cycle (which could have a spray of lubricant in air, or lubricant followed by lubricant in air) after which the sequence would repeat.

The lubricant passages could possibly incorporate a captive ball to prevent lubricant being shaken out when not being discharged under pressure. In particular such a ball could be fitted in the passage 14 in the plug 16 of FIG. 1, or in the rising passage 118 in the plate 76.

It is conventional to employ pairs of blank moulds defining halves of mould cavities. These separate laterally from the parison. However, there is an alternative process in which a solid blank mould is employed, which is lifted axially off the parison. This invention could be employed for lubrication of such a solid blank mould.

I claim:

1. In combination a hollow glassware moulding machine comprising blank moulds for forming glass parisons, one or more spray devices fitted to said machine, each spray device comprising an air inlet for pressurised air, means defining a discharge opening for said air, air passage means communicating said air inlet with said discharge opening, said air discharge opening being shaped and arranged such that discharging pressurised air creates a region of reduced pressure drawing in a greater volume of additional air from surrounding atmosphere and forms an air stream therefrom; a lubricant inlet for liquid lubricant, a discharge opening for said lubricant, lubricant passage means communicating said lubricant inlet with said lubricant discharge opening, said lubricant discharge opening being positioned to discharge said lubricant into said indrawn air; and means for periodically discharging lubricant simultaneously with air through said one or more devices onto said blank moulds of said machine.

2. Apparatus according to claim 1 wherein each spray device comprises structure defining a through passage for said indrawn air, and has said lubricant discharge opening positioned to discharge into said through passage.

3. Apparatus according to claim 2 wherein said pressurized air discharge opening is a slot between spaced walls, which slot extends in a continuous circle around said through passage, with a said wall continuing beyond the slot so that the discharging air follows the wall as it discharges into the through passage.

4. Apparatus according to claim 3 wherein the wall continuing beyond the slot merges into the wall of the through passage.

5. Apparatus according to claim 2 wherein said pressurised air discharge opening is a continuous slot encircling said through passage.

6. Apparatus according to claim 5 wherein said lubricant discharge opening is positioned generally centrally above said continuous slot comprising said air discharge opening.

7. Apparatus according to claim 3 wherein each spray device comprises a pair of members each with an aperture for indrawn air, means securing said members together with said apertures aligned to form said through passage, and a shim inserted between said members, spacing said members slightly apart, whereby said slot encircling said through passage is formed between said members.

8. Apparatus according to claim 1 wherein said air discharge opening is proximate to a wall, said wall extending forwardly from the opening so 9. Apparatus according to claim 8 wherein said wall is a prolongation of a wall of said air discharge opening.

10. Apparatus according to claim 4 wherein said lubricant discharge opening is positioned to discharge lubricant into atmosphere subsequently sucked in by said discharging pressurized air.

11. Apparatus as claimed in claim 1 wherein said lubricant discharge opening is positioned to discharge said lubricant into said indrawn air upstream of said air discharge opening.

12. In a method of moulding parisons for hollow glassware by forming molten glass into parisons in blank moulds of an automatic moulding machine, and periodically lubricating said blank moulds, the improvement comprising effecting said lubrication by means of a spray of lubricant in air through one or more spray devices, each such spray device comprising an air inlet for pressurised air, means defining a discharge opening for said air, air passage means communicating said air inlet with said discharge opening, said air discharge opening being shaped and arranged such that discharging pressurised air creates a region of reduced pressure drawing in a greater volume of additional air from surrounding atmosphere and forms an air stream therefrom; a lubricant inlet for liquid lubricant, a discharge opening for said lubricant, lubricant passage means communicating said lubricant inlet with said lubricant discharge opening, said lubricant discharge opening being positioned to discharge said lubricant into said indrawn air, the lubricating being effected by periodically discharging pressurized air from said air discharge opening and simultaneously discharging lubricant from said lubricant discharge opening into said indrawn air.

13. A method as claimed in claim 12 wherein said lubricant discharge opening is positioned to discharge said lubricant into said indrawn air upstream of said air discharge opening.

14. The combination of claim 1 wherein said machine is an Independent Section machine, having blank moulds movable between closed and open positions, said combination comprising means for positioning said one or more spray devices over the closed positions of said blank moulds.

15. The combination of claim 14 wherein said means for positioning said spray devices comprises arms on said machine, each pivotally movable about an upright axis between a retracted position and a position supporting one or more said spray devices over the closed position of respective said blank moulds.

16. The combination of claim 15 wherein each said arm is a funnel arm of said machine.

17. A method according to claim 12 in which a top opening is formed on each parison by means of a neck ring associated with the respective mould cavity, said lubricant being sprayed into said moulds while these are closed, so as to spray both onto each mould cavity and onto a said neck ring beneath each mould cavity.

* * * * *